G. L. LANG.
LUBRICANT CUP.
APPLICATION FILED DEC. 15, 1916.

1,270,846.

Patented July 2, 1918.

WITNESSES:
John A. Mitchell
M. R. McKenney

INVENTOR.
GEORGE L. LANG

BY A. D. F. Libby
ATTORNEYS.

UNITED STATES PATENT OFFICE.

GEORGE L. LANG, OF NEWARK, NEW JERSEY, ASSIGNOR TO SPLITDORF ELECTRICAL COMPANY, OF NEWARK, NEW JERSEY.

LUBRICANT-CUP.

1,270,846.   Specification of Letters Patent.   Patented July 2, 1918.

Application filed December 15, 1916. Serial No. 137,255.

*To all whom it may concern:*

Be it known that I, GEORGE L. LANG, a citizen of the United States, residing at Newark, in the county of Essex and State of New Jersey, have invented certain new and useful Improvements in Lubricant-Cups, of which the following is a specification.

My invention relates to means for furnishing lubrication to shaft bearings and other such machine parts wherein continual contact motion with associated elements necessitates a sufficient amount of lubrication to avoid undue friction and wear. In particular it pertains to means for applying lubricants of that class having a thick and dense consistency such as lubricating grease and the like.

In many machine constructions and especially those of a complicated nature, it is almost invariably the case that certain movable elements are adapted to be operated at higher speeds or under greater load conditions than is the case with other parts of the mechanism. Consequently it is necessary that a greater amount of lubrication be supplied, and at more frequent intervals, to the bearings and journals of one element than to those of another. In view of such requirements it is one of the objects of this invention to produce a device of such character that any suitable amount of lubrication may be applied to any particular bearing, while at the same time it includes means to assure the operator that the proper amount has been applied in each case.

Another object is to provide a lubricator of this character comprising a comparatively few parts of simple and durable construction, which in its manufacture may be punched and formed of flat material. It is further characterized by certain features that contribute to secure a maximum capacity for the lubricant, and is also capable of a wide range of adjustment.

Figure 1:
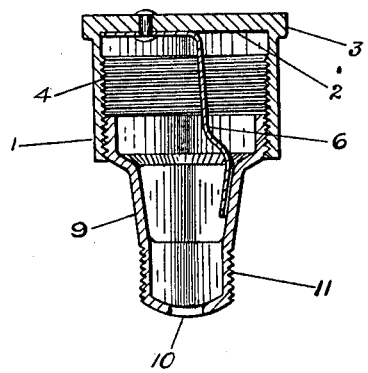
Figure 2:
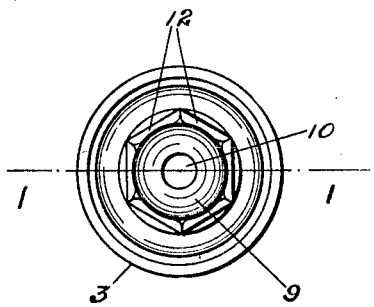
Figure 3:
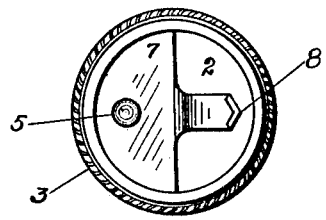

These and other objects will be more clearly apparent from an inspection of the following description, taken in connection with the accompanying drawing which comprises a part of this specification, and wherein:

Figure 1 is a vertical sectional elevation taken on the line 1—1 of Fig. 2 showing the interior arrangement of my lubricating cup, Fig. 2 is a plan view of the cup completely assembled, looking as from the bottom of Fig. 1, and, Fig. 3 illustrates a bottom plan view of the cap portion of the device, showing the manner of attaching the resilient member in place.

Referring to the drawing wherein like reference characters identify corresponding parts throughout the several views, 1 is the cap member which is formed in the shape of a cylindrical cup, and may if desirable, be constructed readily from flat stock of any suitable material. In its formation the head or closed end 2 of said cap is preferably left somewhat thicker than the wall portions and is provided with a peripheral shoulder 3 which may be milled or knurled in any suitable fashion, as seen in Fig. 3, to permit a finger hold for turning said cap. On its interior surface, member 1 has a screw thread 4 which extends substantially throughout the entire depth of the cup. Secured within the cap 1, as by means of a rivet 5 passing through the head 2, is a resilient member 6, such as a leaf spring, having at its fixed end a semicircular portion 7. This semicircular portion has a diameter corresponding to that of cap 1 so that when fixed in place by rivet 5, or some equivalent means, said leaf spring is always held against the liability of displacement. The utility of this simple fastening scheme will be better appreciated as the function of the member 6 is more fully explained. The working portion of the spring 6 is fashioned as shown in Fig. 1, to extend downward and beyond the open end of cap 1. At its free end said spring is shown to be substantially V-shaped to present the knife-edge 8, the purpose of which will hereinafter be explained. The body member 9 of my improved lubricator is provided at one end with a thread corresponding to and adapted to receive the internal thread 4 of cap 1 for the purpose of advancing said cap downward on the body member. The other end of body 9 is closed with the exception of a suitable aperture 10 through which the lubricant is forced to issue under the downward pressure of cap 1. A screw thread 11 permits the device to be secured to a bearing or the like for which it is to furnish the necessary lubrication. Intermediate its screw threaded ends the body 9 consists of a downwardly tapering portion. In the construction of said body this intermediate portion is formed so as to present, both without and within, a series of angular sections 12. Exteriorly said angular surfaces serve as a means whereby a wrench or like tool may be used to secure the lubricator in place.

When assembled the depending V-shaped end 8 of spring 6 is adapted to coöperate with the notches formed within the body 9 by the intersection of the angular sections 12, to thereby hold the cap 1 firmly in any suitable adjusted position that the operator may desire. In the embodiment shown the spring 6 preferably has its end V-shaped as described. However, I have found that a flat spring may be successfully employed.

Assuming the device to be filled with lubricant and attached to its shaft bearing, and considering especially its use in connection with those machines wherein instructions of operation specify that each particular bearing should be supplied with a given amount of lubricant at certain intervals, in order to insure the most efficient and economic operation, it is merely necessary for the operator to screw the cap 1 down a sufficient number of turns to force the required amount of lubricant through the aperture 10. By virtue of the flexible engagement of spring 6 with the internal notches formed by angular sections 12 the cap 1 is held at all times in its adjusted position against any tendency to unscrew due to jar and vibration. By this means the operator is assured that the cap 1 is always in readiness to force the lubricant through the orifice 10, thereby enabling the proper amount to be applied and likewise eliminating unnecessary waste. The head of the rivet 5 being disposed as it is to one side of the center of cap 1, moves with said cap in a circular path and thereby serves as a visible means to enable the operator to give the cap 1 the desired number of turns.

While I have described my lubricant cup as being especially suited for machines of the above mentioned character, wherein it is desirable to regulate and control with considerable accuracy the supply of lubricant, it is not limited to such use but may be utilized with many types and classes of machinery.

One advantageous feature of this invention resides in the construction of the body 9. This element is drawn from flat stock, being formed so as to provide the flat surfaces 12, which extend, in length, throughout a substantial portion of the body, with the particular purpose in view of securing a wide range of movement of the cap 1. These angular sections 12 are provided, as seen in Fig. 1, with a downward taper. In view of this fact the spring 6 will press into the corresponding notches of said sections with less force when the cap 1 is at its farthest upward position relative to body 9. Consequently after having disassembled the cap 1 for inspection or to refill with lubricant said cap may be much more readily threaded upon body 1 due to the fact that, as described, the pressure of spring 6 is considerably weaker at this point.

Another feature derived from my invention is the influence the spring 6 has upon the lubricating medium under certain conditions. In other words, should for any reason the temperature of the lubricant cup become sufficient to fuse the lubricant therein, the irregularly shaped spring 6 serves as a means to retain said lubricant within the cup and to prevent the same from unduly discharging through the orifice 10. This advantage is especially commendable where lubricants are used having a comparatively thin consistency, and also when used in connection with bearings which are subject to becoming heated excessively at times.

The number of angular sections 12, the particular design of spring and other such features are all capable of changes and modifications, and hence I do not wish to limit myself to the precise details shown and described.

Having thus described and ascertained the nature of my invention what I claim is:—

1. A lubricant device having in combination, a cap member of circular cup-shaped formation and having internal threads therein, a hollow body member having threads at one end adapted to receive the internal threads of said cap, a substantial portion of said body member intermediate its ends being formed to give a series of intersecting flattened surfaces both on the outside and inside of the body member, and a resilient member having a semicircular portion at one end of substantially the same diameter as said cap and adapted to be secured within said cap in such a manner that said semicircular portion engages the walls of the cap to hold said resilient member against displacement, the other end of said resilient member extending downward to yieldingly engage said internal flattened surfaces to thereby hold the cap member in its adjusted position, the flattened surfaces on the exterior of said body member serving as a wrench-hold.

2. A lubricant device having in combination, a cap member of cup-shaped formation having internal threads therein, a hollow body member having threads on one end adapted to engage said internal threads, a substantial portion of said body member intermediate its ends being formed to give a series of angular surfaces within said body, and a resilient member having a semicircular portion at one end by means of which the same is securely fastened within said cap member, the free end of said resilient member being V-shaped and disposed in a manner to flexibly coöperate with the internal angular surfaces of said body, thereby holding said cap securely in its adjusted position upon said body member.

3. A lubricant device having in combination, a hollow body member constructed of flat material, a cap member screw threaded thereupon for axial movement relative thereto, a leaf spring having an enlarged semicircular portion at one end by means of which the same is securely fastened to the bottom of said cap, and an orifice in the end of the body member, said body member having a substantial portion of its length formed to give a series of corresponding internal and external flat surfaces, said external surfaces serving as a means to apply the body member in its working position, said leaf spring having its free end disposed so as to engage at the intersections of said internal flat surfaces for the purpose of holding said cap securely in its adjusted position upon the body member.

4. A lubricant device having in combination, a hollow body member punched from flat stock, a cap member screw threaded thereupon for axial movement relative thereto, a resilient member secured at one end of said cap, and an orifice in the end of said body member, said body member having a substantial portion of its length provided with a series of internal angular surfaces, said resilient member having its free end in pressing engagement with said angular surfaces in order to hold the cap in adjusted position upon said body member, said angular surfaces tapering in such a way that the pressure exerted thereupon by the resilient member is a minimum when the cap is at its extreme uppermost position on said body, thereby facilitating the threading of said cap upon the body member after said device has been inspected or replenished with lubricant.

5. A lubricant device having in combination, a hollow body member constructed of flat material, a cap member screw threaded thereupon for axial movement relative thereto, a leaf spring having an enlarged semicircular portion at one end, a fastening member passing through the head of the cap and said semicircular portion to secure said leaf spring in place within said cap member, and an orifice in said hollow body, said body having a portion of its length provided with angular surfaces with which the free end of said spring flexibly coöperates for the purpose of retaining the cap member in its adjusted position upon the body member, said cap being adapted to force lubricant through said orifice when turned upon the body member, and said fastening member serving also as a visible indicator to enable the operator to give said cap the desired number of turns.

In witness whereof I affix my signature.

GEORGE L. LANG.

Copies of this patent may be obtained for five cents each, by addressing the "Commissioner of Patents, Washington, D. C."